US005739746A

United States Patent [19]
Shaffer et al.

[11] Patent Number: 5,739,746
[45] Date of Patent: Apr. 14, 1998

[54] METHOD AND APPARATUS FOR DETERMINING USER PRESENCE IN VEHICULAR COMMUNICATIONS SYSTEMS

[75] Inventors: Shmuel Shaffer, Palo Alto; William Joseph Beyda, Cupertino, both of Calif.

[73] Assignee: Siemens Business Communication Systems, Inc., Santa Clara, Calif.

[21] Appl. No.: 747,413

[22] Filed: Nov. 12, 1996

[51] Int. Cl.$^6$ ............................................. B60Q 1/00
[52] U.S. Cl. .................. 340/425.5; 340/666; 340/668; 340/565; 379/58
[58] Field of Search .......................... 340/425.5, 666, 340/667, 457.1, 565; 379/204, 58

[56] References Cited

U.S. PATENT DOCUMENTS

| 4,223,915 | 9/1980 | Tanaka et al. | 280/804 |
| 4,681,347 | 7/1987 | Tamura et al. | 280/804 |
| 5,058,150 | 10/1991 | Kang | 379/58 |
| 5,278,891 | 1/1994 | Bhagat et al. | 379/58 |
| 5,291,020 | 3/1994 | Lee | 250/342 |
| 5,408,515 | 4/1995 | Bhagat et al. | 379/59 |
| 5,438,610 | 8/1995 | Bhagat et al. | 379/58 |
| 5,479,479 | 12/1995 | Braitberg et al. | 379/58 |

*Primary Examiner*—Jeffery Hofsass
*Assistant Examiner*—Daryl C. Pope

[57] ABSTRACT

A vehicular telecommunications system having user detection features. A telephone controller 504 is comprised in a vehicle and adapted to process a plurality of telephone signals. A telephone 37 is configured to receive telephone calls for the user from sources external to the vehicle in which the telephone is installed. A user detector 52 is operably coupled to the telephone controller 504 and configured to provide a signal to the telephone controller 504 indicative of whether the user associated with the telephone is determined to be present in a predetermined location of the vehicle, such that the telephone controller directs a received telephone call for the user to the telephone responsive to the signal. Exemplary user detectors include passive infrared detectors 52c and switching mechanisms 52a, 52b associated with a coupled seatbelt 523 or the user's presence in or near a seat 501.

36 Claims, 12 Drawing Sheets

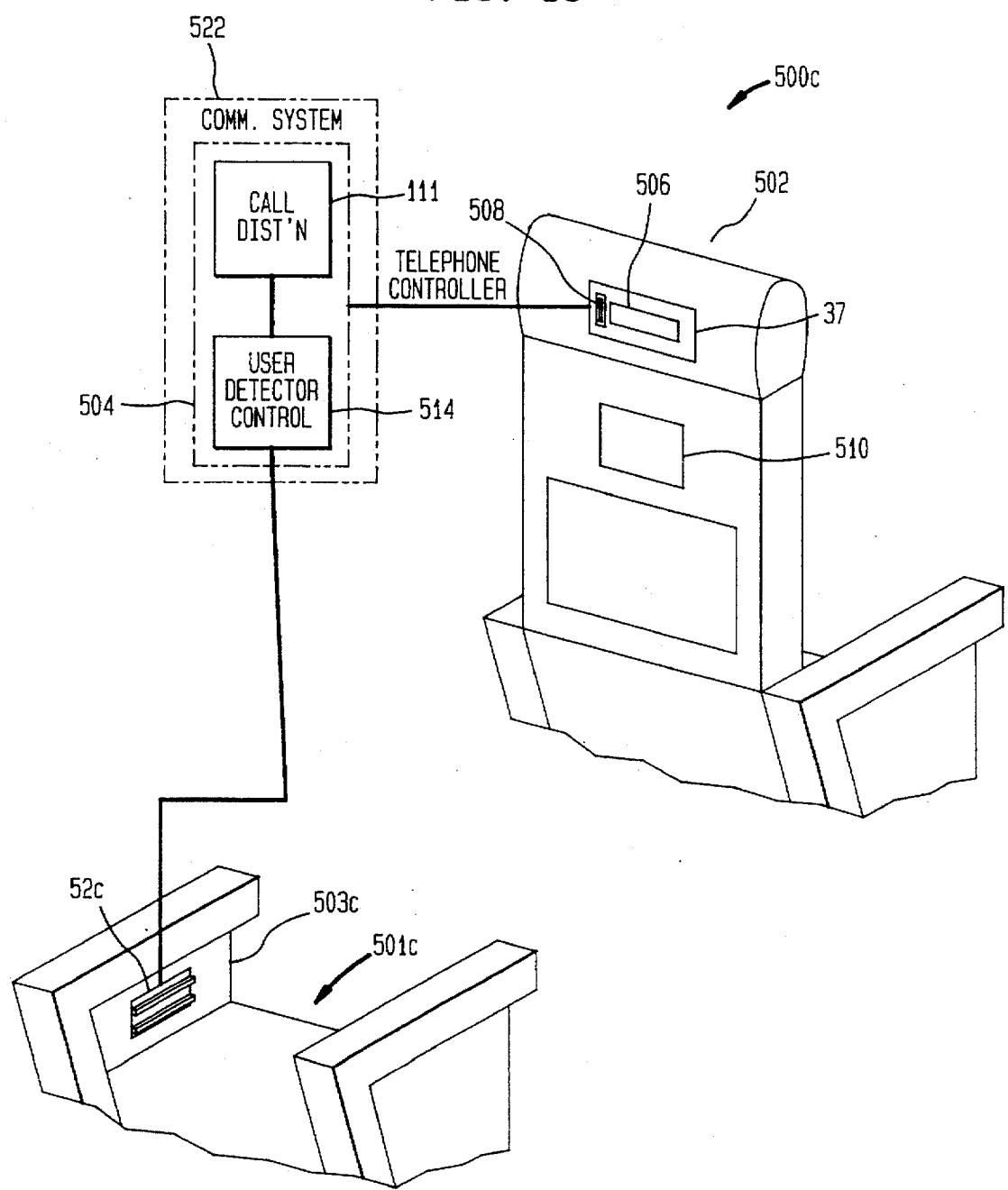

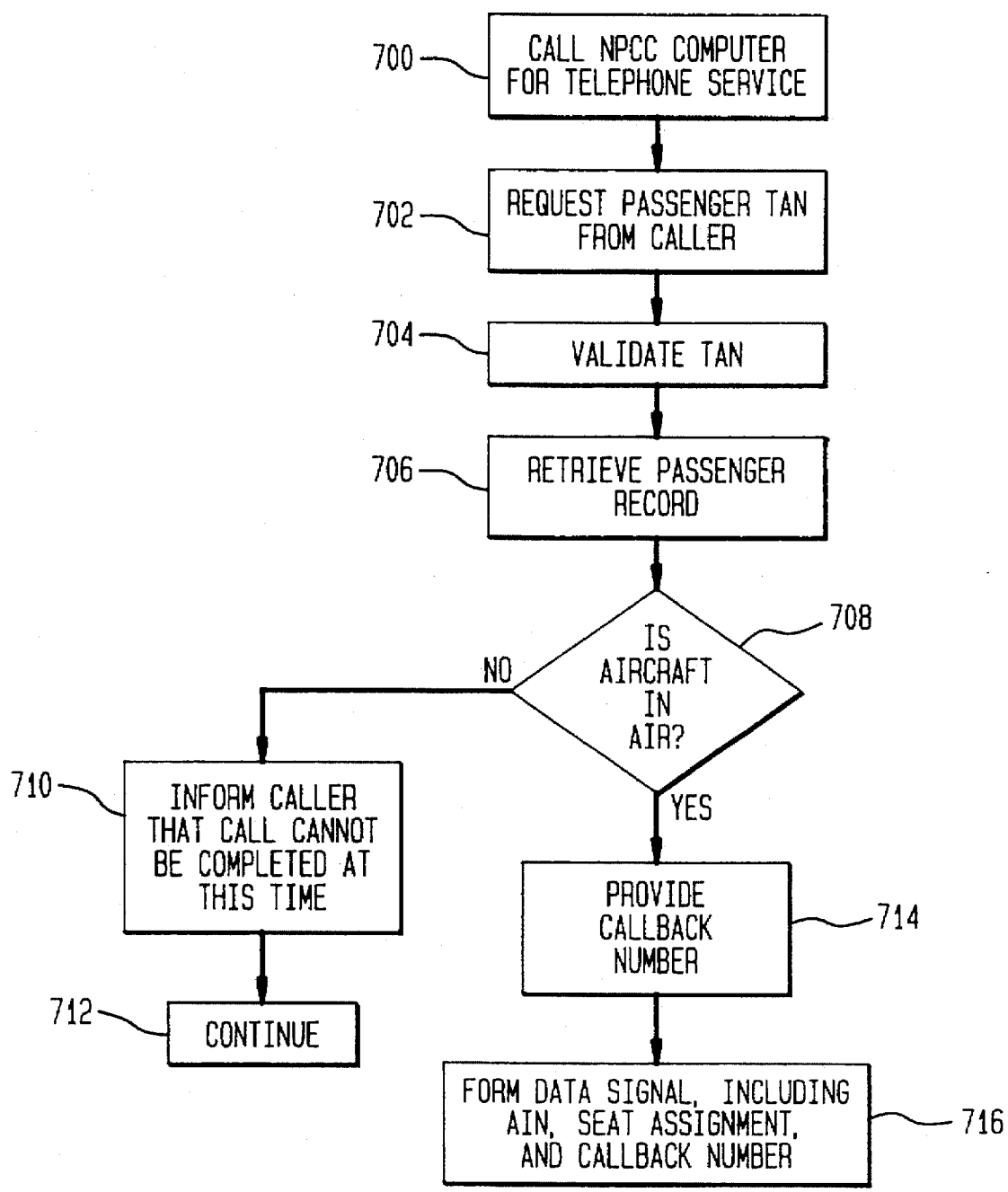

METHOD AND APPARATUS FOR DETERMINING USER PRESENCE IN VEHICULAR COMMUNICATIONS SYSTEMS

BACKGROUND OF THE INVENTION

1. Field of the Invention

The present invention relates to vehicular communications systems and, more particularly, to a method and apparatus for detecting the presence of a user associated with a vehicular telecommunications system.

2. Description of the Related Art

Vehicular telecommunications systems, such as cellular telephones in automobiles and credit card telephones in multi-passenger vehicles such as aircraft, are becoming increasingly commonplace.

A credit card telephone is typically installed in the bulkhead or the seat back of the passenger seat in front of the user. The telephone includes a handset, a credit card reader, and a housing for the credit card reader and the handset. When the passenger or user inserts a credit card into the credit card reader, he or she may initiate a telephone call using the handset.

Until recently, while a passenger could initiate a telephone call using a credit card telephone within the multi passenger vehicle, the passenger was unable to receive a telephone call made by a party from outside the vehicle. In the case of an airplane, the passenger was unable to receive a call from a party not on the airplane. Recently, however, some airplanes include the capability of assigning a particular passenger a passenger identification code associated with the passenger's seat location such that the passenger can be notified of an incoming telephone call. The association of the passenger code with the seat location may occur through the use of a credit card inserted into the credit card slot, followed by the entry of the identification code. The passenger is notified of an incoming call through a call notification signal, and some type of calling party identification information is provided to the passenger on board the vehicle subsequent to call notification. Once the passenger has received notice of the telephone call, the passenger may insert his credit card into the credit card reader and return the phone call.

Such vehicular telephones which allow incoming calls, however, suffer from several drawbacks in their passenger notification and user interface features. Typically, the call notification mechanism is a ringer of some kind that emits an intrusive and attention-getting sound when an incoming call is received. While such ringers are adequate to notify the relevant passenger of an incoming call, they are disadvantageous in that they also disturb other passengers who may be disinterested in being notified of someone else's incoming call. This is particularly the case if, for example, the passenger to whom the call is to be directed has left his seat and is out of earshot of the ringing. Moreover, typical credit card telephones require the user to insert his or her credit card into the credit card slot and re-enter an identification number before the call can be returned, so as to ensure that the proper party has responded. Thus, a disturbed co-passenger cannot pick-up and terminate the ringing.

Motor vehicle telephones suffer from a similar drawback. Power is typically supplied from the vehicle battery to the telephone if the ignition key is in the "on" or "accessory" position. The telephone may then be activated by pressing an on-switch, or by lifting a handset from a cradle or housing. There are circumstances, however, in which a driver or passenger might wish to use the telephone without having first to insert the key into the ignition. For example, in an emergency, the driver might have neither the time nor the dexterity to fumble with the ignition key prior to calling for assistance.

Therefore, an improved vehicular telecommunications system and method is desired which provides an improved user interface. More particularly, an improved vehicular telephone apparatus and method is desired which reliably detects the presence of a target passenger or user.

SUMMARY OF THE INVENTION

A vehicular telecommunications system having user detection features is provided. In one embodiment, a telephone controller is comprised in a vehicle and adapted to process a plurality of telephone signals from sources external to the vehicle. The telephone controller is further configured to provide the signals to a plurality of telephones within the vehicle. A user detector associated with each telephone is operably coupled to the telephone controller and configured to provide a signal to the telephone controller indicative of whether the user associated with the respective telephone is determined to be present in a predetermined location of the vehicle (such as a seat). The telephone controller directs a received telephone call for the user to the corresponding telephone responsive to the signal from the respective user detector. If the user is determined not to be present, the telephone controller may hold the message and/or notify the caller to call back at a later time.

In one embodiment, the user detector comprises a passive infrared detector positioned to detect the entry and exit of the user in a predetermined location of the vehicle, such as a seat. The passive infrared detector has a pair of infrared sensors adapted to detect the movement of the user into and out of the seat. The infrared detector is adapted to reject spurious signals, such as temperature gradients within the vehicle cabin. Furthermore, the infrared detector is configured to ignore signals below a predetermined threshold that result from infrared sources other than the user.

In another embodiment, the user detector comprises a switch and associated circuitry positioned within the user's seat. The switch is configured to be activated upon the user's seating himself in the seat. Once activated, the detector sends a signal to the telephone controller indicative of the user's presence or absence. The user detector may be positioned within the horizontal (seat) portion or the vertical (back) portion of the vehicle seat. In still another embodiment, the user detector comprises a switch and associated circuitry positioned within the seatbelt of the user's seat. When the user fastens the seatbelt, the switch is activated, transmitting the signal to the telephone controller.

A vehicular telecommunications system having user detection features for use in a motor vehicle is also provided. In one embodiment, a telephone such as a cellular telephone is provided in a motor vehicle. The telephone includes a power controller including a power management unit and a relay. A user detector is coupled to the power management unit such that when the user, such as a driver, enters the vehicle, a signal is provided to the power management unit, which causes the relay to couple power from a vehicle battery to the telephone.

In one embodiment, the user detector comprises a passive infrared detector positioned on the motor vehicle's dashboard or other location convenient to detect the entry and exit of the user into the vehicle. The passive infrared detector has a pair of infrared sensors adapted to detect the movement of the user. The infrared detector is adapted to reject spurious signals, such as temperature gradients within the vehicle. Furthermore, the infrared detector is configured to ignore signals below a predetermined threshold that might result from infrared sources other than the user.

In another embodiment, the user detector comprises a switch and associated circuitry positioned within the user's seat. The switch is configured to be activated upon the user's seating himself in the seat. The user detector may be positioned within the horizontal (seat) portion or the vertical (back) portion of the vehicle seat.

In still another embodiment, the user detector comprises a switch and associated circuitry positioned within the seatbelt of the user's seat. When the user fastens the seatbelt, the switch is activated, transmitting a signal to the power management unit. The user detector may also be provided for use with an automatic or partially automatic seatbelt system. Such a seatbelt mechanism typically comprises a shoulder-type belt attached to a slider which slides on a guide rail and secures the user in response to the user's entry into the vehicle. In such an embodiment, a switch and associated circuitry are provided to detect either the user's entry into the vehicle or the locking of the slider mechanism.

BRIEF DESCRIPTION OF THE DRAWINGS

A better understanding of the present invention can be obtained when the following detailed description is considered in conjunction with the following drawings in which:

FIG. 1A, 1B, and 1C are diagrams of a passenger interface and detection system according to the present invention;

FIG. 3A, 3B, and 3C are flowcharts of the operation of the vehicular telecommunications system with user detection of FIG. 2;

DETAILED DESCRIPTION OF THE INVENTION

Figure 1A:
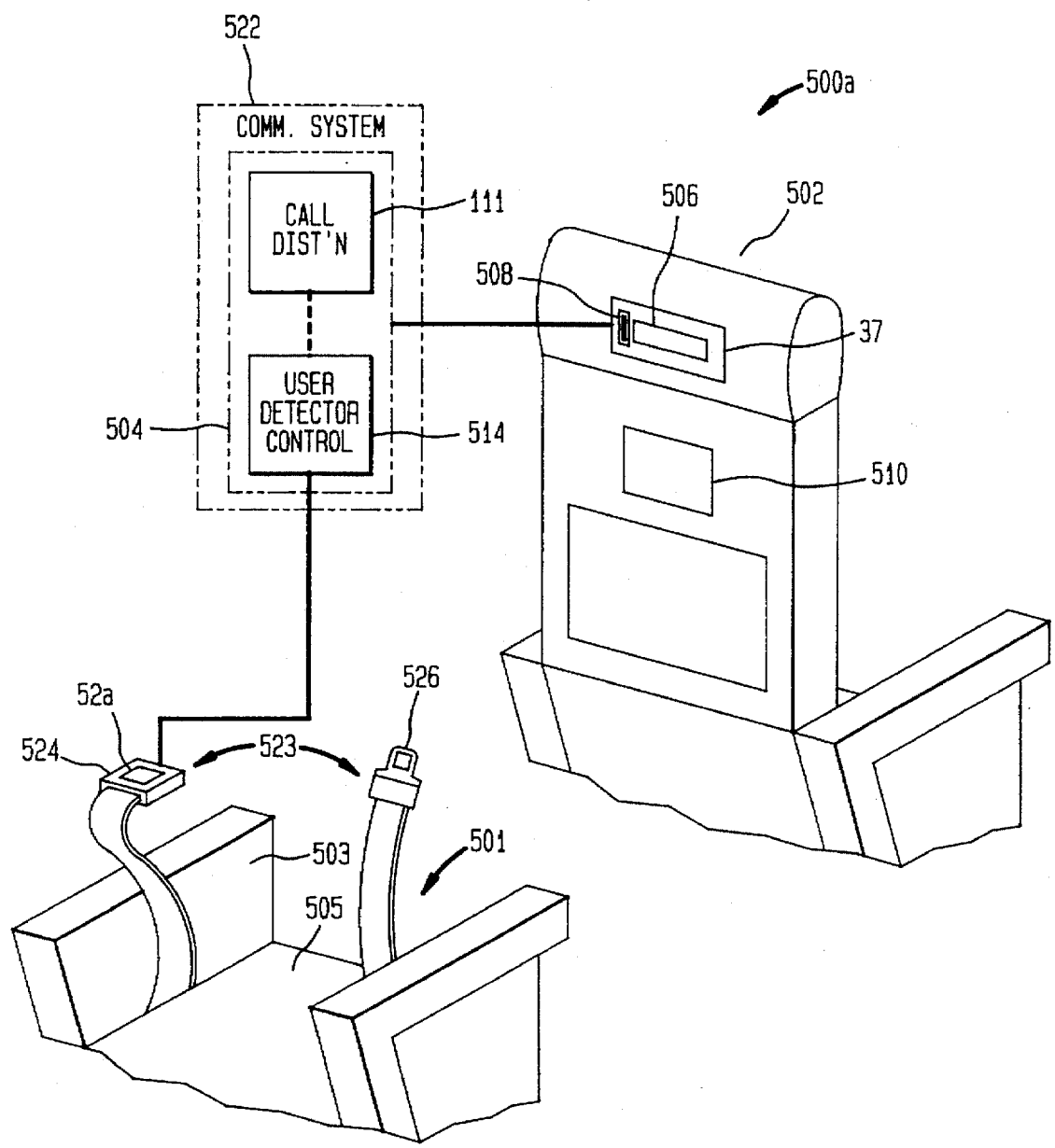

FIG. 1A—Passenger Interface with Seatbelt Detection Mechanism

FIG. 1A illustrates a passenger interface 500a to a vehicular communications system 522 in a multi-passenger vehicle. As shown, the vehicular communications system 522 includes a call distribution unit 111 and a user detector control unit 514 coupled to or comprised within a telephone controller 504. Vehicular communications system 522 is preferably located at a convenient location within the multi-passenger vehicle. The passenger interface 500a is shown for a user or passenger seated in seat 501. It is understood that the passenger interface 500a is provided for a plurality or all of the seats in the multi-passenger vehicle and that the passenger interface 500a for one seat 501 is described here for simplicity. Telephone system 522 is coupled to provide signals to each telephone 37 in the multi-passenger vehicle, as will be discussed in greater detail below.

The user's seat 501 typically is provided behind another passenger's seat 502. A telephone 37, including a credit card slot 508 and a telephone handset 506, is provided in a housing incorporated into the seat back of passenger seat 502. It is noted that when the user's seat 501 is the first seat in a row and hence is not behind another seat, the telephone 37 may be provided in a cabin bulkhead or other structure of the multi-passenger vehicle. In addition, the telephone 37 may be provided within the arm rest 503 of user seat 501. As used herein, the term "telephone" includes a standard POTS (Plain Old Telephone Service) telephone or ISDN (Integrated Services Digital Network) telephone, or other types of communications devices.

User's seat 501 includes a seatbelt 523 comprising a receptacle or female end 524 and an insertable or male end 526. Receptacle end 524 and insertable end 526 are configured to couple in such a fashion that the passenger is secured by the seatbelt when the ends are coupled. In the embodiment of FIG. 1A, receptacle end 524 includes a user detector 52a, as will be discussed in greater detail below. User detector 52a is configured to provide a signal to user detector control 514 when receptacle end 524 and insertable end 526 are coupled and, hence, the passenger is presumably seated.

Figure 1B:
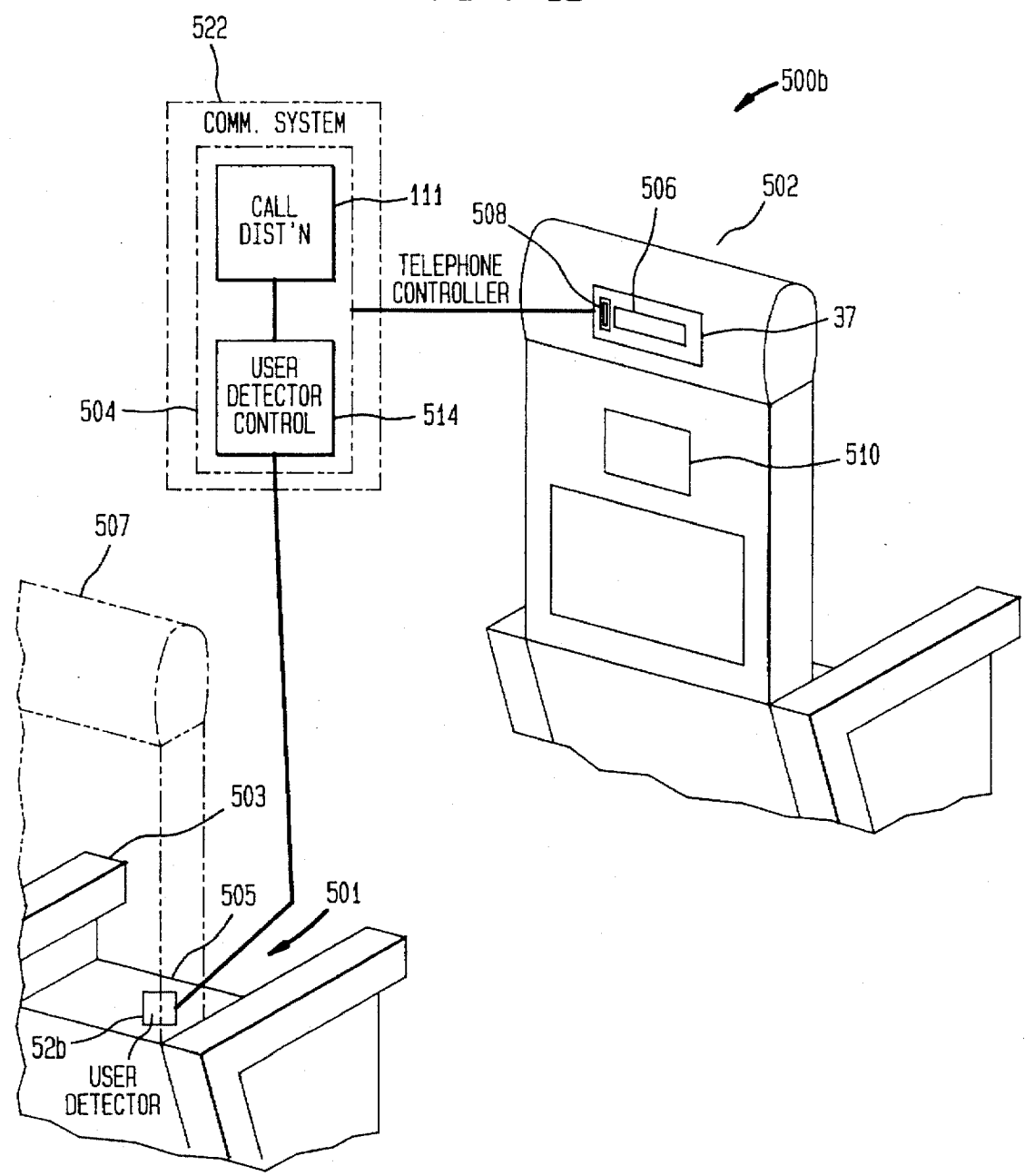

FIG. 1B—Passenger Interface with Seat Detection Mechanism

Turning now to FIG. 1B, an alternative embodiment of a passenger interface 500b having user detection is illustrated. For convenience, components common to FIG. 1B retain the same reference numerals.

In the embodiment of FIG. 1B, a user detector 52b is positioned within seat 501. It is noted that while the user detector 52b is illustrated in the seat portion 505 of passenger seat 501, user detector 52b could also be located within the seat back 507 (illustrated in phantom) of passenger seat 501. Thus, FIG. 1B is exemplary only. User detector 52b comprises, for example, a switch that is activated when the passenger is seated. The user detector 52b thus provides a signal to the user detector control 514 when a passenger is seated. The switch in user detector 52b preferably activates upon sensing, for example, a pressure or temperature change.

FIG. 1C—Passenger Interface with Passive Infrared Detection Mechanism

Turning now to FIG. 1C, still another embodiment of a passenger interface 500c having user detection is illustrated. For convenience, components common to FIG. 1A and FIG. 1B retain the same reference numerals.

In the embodiment of FIG. 1C, a user detector 52c is positioned within the inside surface of arm rest 503c of seat 501. It is noted that while user detector 52c is illustrated in the arm rest 503c of seat 501, user detector 52c could also be positioned in various other locations, such as within the facing seat back of passenger seat 502. Thus, FIG. 1C is exemplary only. User detector 52c comprises, for example, a passive infrared (PIR) detector configured to detect heat sources such as a passenger in the seat. When the passive infrared detector detects a heat presence, a signal is sent to user detector control 514, notifying the communications system of the passenger's presence. User detector 52c further includes signal processing circuitry, as will be discussed in more detail below, to reject spurious signals.

User detector 52c may also comprise an active infrared source with a corresponding receiver positioned on the inside surface of the opposing arm rest associated with seat 501. In this embodiment, the IR source transmits an IR beam to the receiver. The receiver detects an interruption of the IR beam from the source and thus detects the presence or absence of the passenger.

Figure 2:
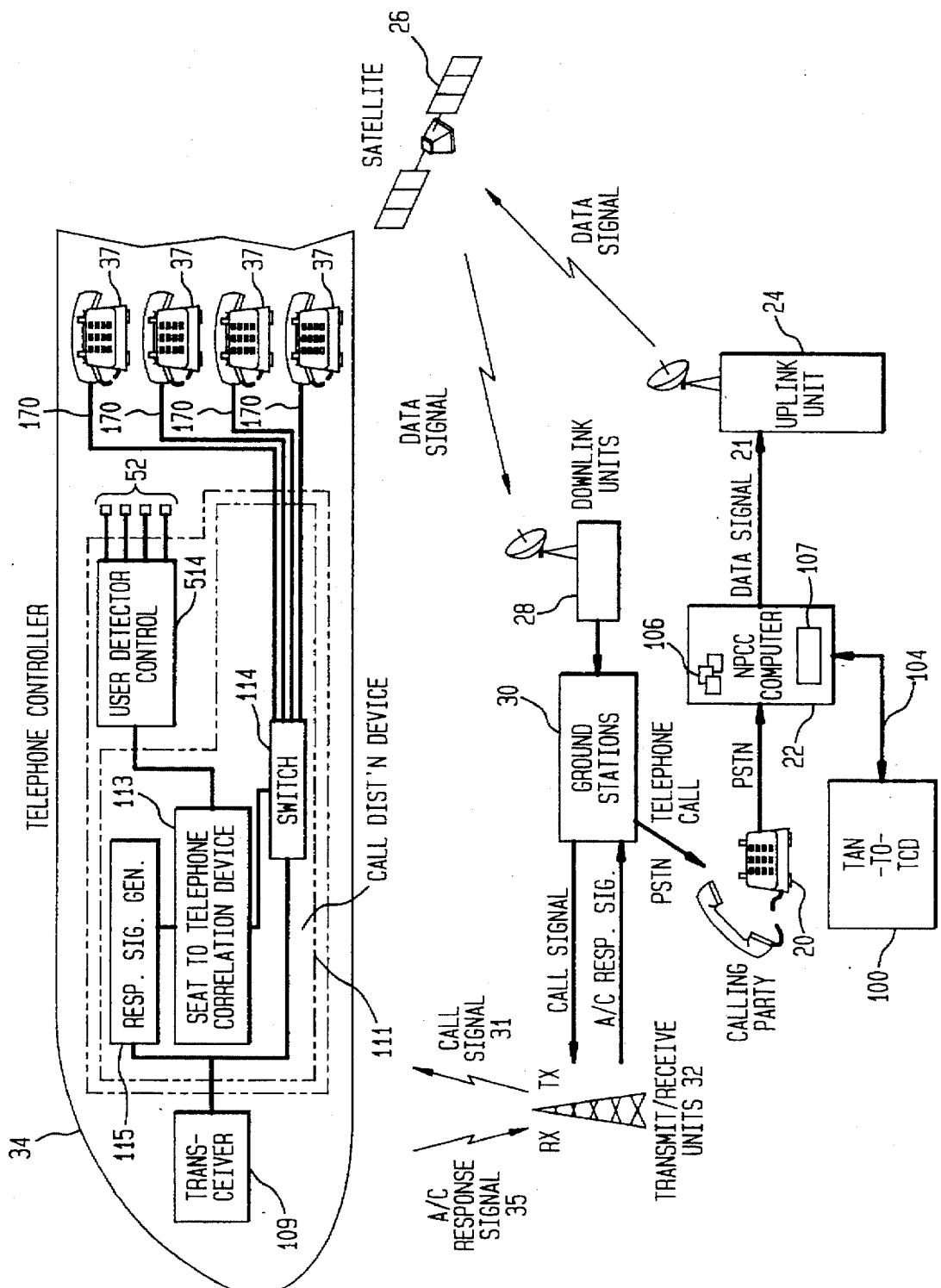
FIG. 2 is a block diagram illustrating a vehicular telecommunications system having a user detection system according to the present invention.

FIG. 2—Vehicular Communications System

Turning now to FIG. 2, an embodiment of a user detection system for a vehicular telecommunications system is shown according to the present invention. FIG. 2 illustrates the user detection system in an airplane 34. However, it is noted that the user detection system may be comprised in other types of multi-passenger vehicles, such as buses, railroad cars, etc. Thus, FIG. 2 is exemplary only.

FIG. 2 illustrates a communications system capable of directing a call to a particular telephone assigned to a passenger on the aircraft. For example, in one embodiment in which a telephone is provided for each seat on an airplane, a call to a passenger is routed directly to the telephone at the passenger's seat. The system of FIG. 2 includes a complete communications system, including a calling party telephone 20, a national paging control computer (NPCC) 22, an uplink unit 24, a satellite 26, a plurality of downlink units 28, a plurality of ground stations 30, a plurality of transmit/receive units 32, and an aircraft 34 having one or more airborne telephones 37 located thereon. It is noted that the vehicular telephone call notification system of the present invention may be used in conjunction with various types of communications systems, and the communications system as shown in FIG. 2 is exemplary only.

Calling party telephone 20 is coupled to the input of NPCC computer 22 via the public switched telephone network (PSTN). The output of NPCC computer 22 is coupled to provide data signal 21 to the input of uplink unit 24. Uplink unit 24, satellite 26, downlink units 28, ground stations 30, and transmit/receive units 32 form a signal transmitting and receiving network which covers any preselected geographic region. Data signal 21 is subsequently uplinked by uplink unit 24 to satellite 26 which transmits data signal 21 to downlink units 28. The output of each downlink unit 28 is coupled to an input of a corresponding ground station 30. Ground stations 30 receive data signals 21 from downlink units 28. An output of each ground station 30, i.e., a call signal 31, is coupled to an input of a corresponding transmit/receive unit 32. Each transmit/receive unit 32 subsequently transmits call signal 31 to possible aircraft locations. If the airborne telephone 37 on aircraft 34 receives a call signal from any transmit/receive unit 32, i.e., if the call signal is intended for a telephone 37 located on the aircraft 34, then an aircraft response 35 is formed and transmitted from the airborne telephone(s) or telephone system to the transmit/receive unit 32 from which the call signal was received. Aircraft response signal 35 is then passed from an output of transmit/receive unit 32 to an input of the corresponding ground station 30. Ground station 30 is coupled to the calling party over the PSTN.

Subscribers to the ground-to-air telephone service are assigned a unique traveler assigned number (TAN) by a service operator. The TAN may be, for example, the subscriber's social security number, frequent flyer number, or any code or similar identifier sufficient to uniquely identify that subscriber. Also, each aircraft participating in the service is assigned a unique aircraft identification number (AIN), which may comprise any code or identifier sufficient to uniquely identify that aircraft.

The embodiment of FIG. 2 further includes a TAN-to-telephone correlation device (TAN-to-TCD) 100. In this embodiment, TAN-to-TCD 100 is located at airline ticket counters of airports corresponding to geographic regions in which the airplane telephone service is offered. In other embodiments, the TAN-to-TCD 100 is located within the aircraft.

The telephones 37 may be distributed throughout the aircraft in any manner; for example, one telephone for each seat, one telephone for each row or block of seats, or one telephone at the front of the aircraft and one at the rear of the aircraft. In one embodiment, upon check-in at a ticket counter (not shown), an operator (not shown) enters into the TAN-to-TCD 100 the subscriber's TAN and seat assignment on the aircraft and the aircraft's AIN (Henceforth, the subscriber is referred to as a "passenger."). The ticket counter operator may also enter the times that the passenger is scheduled to be in the assigned seat (typically the scheduled flight time).

The TAN-to-TCD 100 forwards the foregoing information to the NPCC computer 22 via connection 104. The NPCC computer 22 builds a passenger record 106 for the passenger, which includes the passenger's TAN and seat assignment information and the aircraft's AIN, and administers the telephone service for the passenger during his or her flight. The NPCC computer 22 may also be configured to receive flight time update information, or a signal indicating the termination of the flight, since the scheduled flight time is not necessarily an accurate indication of actual flight time.

As noted above, in an alternative embodiment, the TAN-to-TCD functionality is performed on-board the aircraft. For example, the passenger may log into the system by inserting his credit card into the on-board telephone and enter his TAN. The record or the input information associating the user with the telephone (and the aircraft) is transmitted to a ground station, which provides it to the central NPCC. This embodiment obviates the need for a computer terminal and associated ticket counter operator in the airport.

Turning back to FIG. 2, the embodiment of FIG. 2 also includes a transceiver 109, a call distribution device 111, and a plurality of telephones 37 on the aircraft 34. Receiver/transmitter 109 on board aircraft 34 is capable of receiving RF call signal 31 and transmitting RF A/C response signal 35. Receiver/transmitter 109 preferably comprises a multi-channel digital RF receiver/transmitter in compliance with the 800 MHZ system mandated by the FCC.

Call distribution device 111 is connected to each telephone 37 on aircraft 34 via connections 120. Call distribution device 111 includes response signal generator 115, seat-to-telephone correlation device 113 and switch 114. Response signal generator 115 responds to the AIN in the received call signal 31 and generates A/C response signal 35 if the AIN corresponds to that aircraft. Seat-to-telephone correlation device 113 correlates each seat on the aircraft with a particular telephone on the aircraft. For example, if each seat on the aircraft is equipped with a telephone, there is a one-to-one correspondence between the seats and telephones. If, however, there is one telephone for a plurality of seats, for example, one row of three seats, seat-to-telephone correlation device 113 correlates those three seats to a particular telephone 37, which may be conveniently located with respect to all three seats. Switch 114 establishes a connection between the caller and the corresponding telephone 37.

A user detector control 514 is coupled to a plurality of user detectors 52 and is coupled to provide an indication to the seat-to-telephone correlation device 113 that the appropriate user is seated. User detectors 52 are associated with at least a subset of the telephones 37, such as all of the telephones in the first class section, in the aircraft. As discussed above, user detectors 52 may comprise, for example, passive infrared detectors, or detectors such as switches and associated circuitry within the passenger seats or seatbelts. It is noted that user detector control 514 need not be a centralized system; it may, for example, be a distributed to each seat. Similarly, user detector control 514 may be coupled within call distribution device 111 rather than, as illustrated, as a discrete unit.

FIG. 3A—Call Formulation and Reception

FIG. 3A is a flowchart illustrating the operation of the system to formulate a telephone call. It is noted that various types of call operations may be employed, as desired. As shown in FIG. 3A, calling party 20 initiates a call to the passenger by calling the NPCC computer 22 via the public switched telephone network (PSTN) the NPCC computer 22 prompt device 107 within the NPCC computer 22 prompts the calling party 20 to input the passenger's TAN (step 702). The calling party then inputs, via telephone 20, the TAN number of the airborne telephone. The NPCC computer may then validate the TAN (step 704). The NPCC computer 22 then retrieves the passenger record 106 corresponding to the TAN (step 706). The NPCC computer 22 then determines whether or not the aircraft is in the air (step 708). If the caller has called during a time outside the actual or scheduled flight time of the passenger, the NPCC computer 22 informs the caller that the call cannot be completed at this time, or provides some other appropriate message (step 710), and continues with normal processing. If, instead, the caller has called during the passenger's flight time, the caller's callback number is provided, either through standard caller-identification methods or in response to a request by the NPCC computer 22 that the caller input a callback number (step 714). After the callback number is received by the NPCC computer, the calling party 20 hangs up and awaits a return call. The NPCC computer 22 then formulates a data signal 21 from the AIN, passenger seat assignment information and the callback number (step 716). Further details concerning data signal formulation may be obtained from Bhagat et al., U.S. Pat. No. 5,438,610, issued Aug. 1, 1995, which is hereby incorporated by reference in its entirety as though fully and completely set forth herein.

Figure 3B:
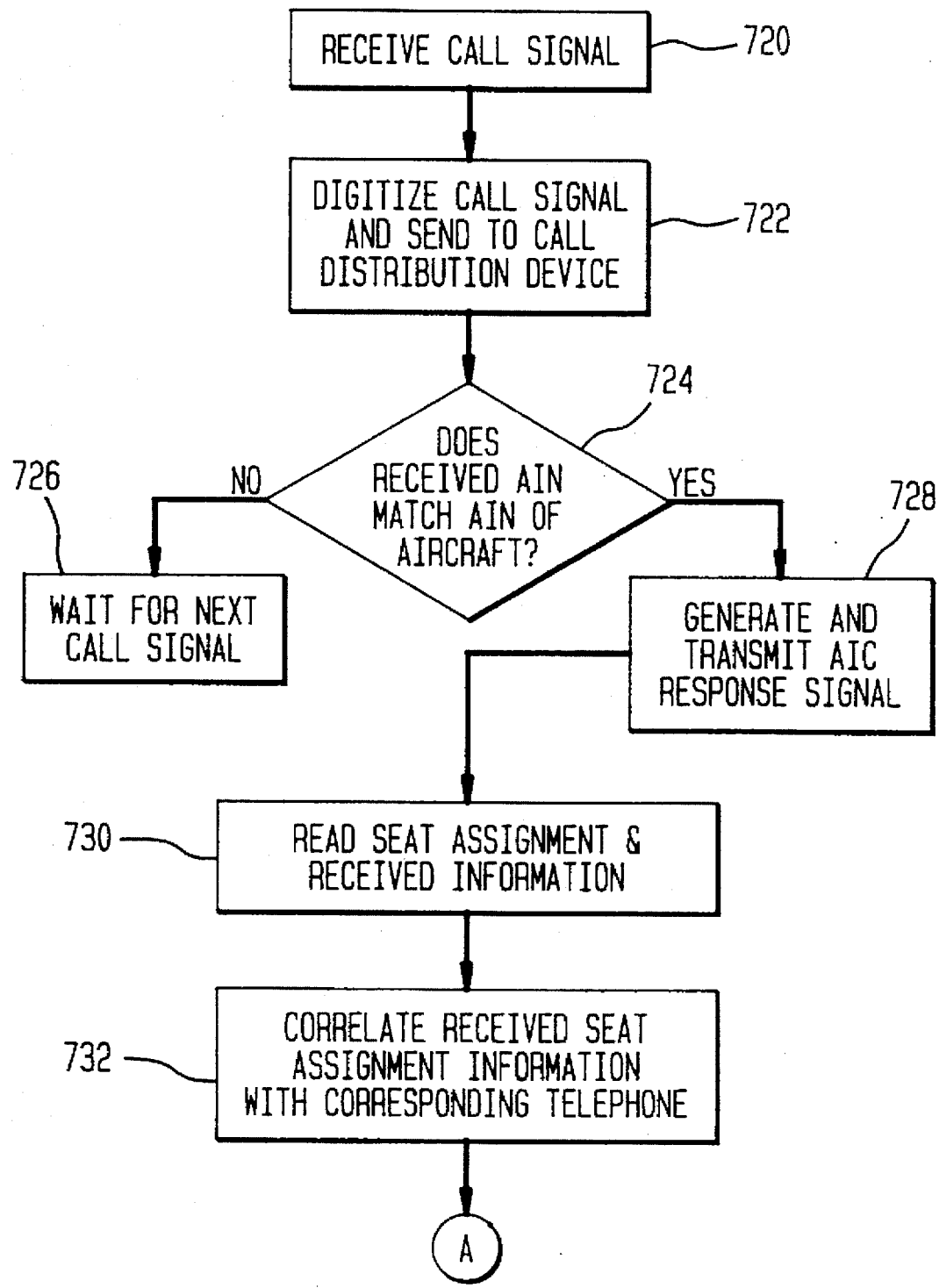
Figure 3C:
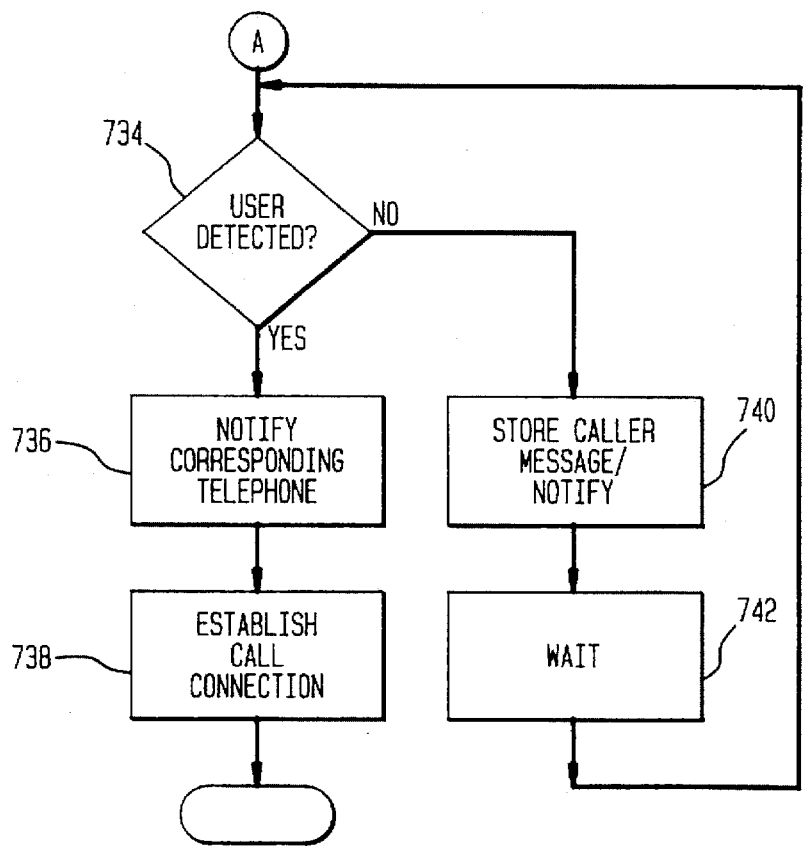

FIG. 3B and 3C—Call Reception and Passenger Detection

FIG. 3B and 3C illustrate the operation of transceiver 109, call distribution device 111 for receiving and distributing calls to a passenger, and user detector control 514. Call signal 31 is received by transceiver 109 (step 720), which digitizes the received RF signal and transfers the digitized call signal to response signal generator 115 of call distribution device 111 (step 722). Response signal generator 115 reads the AIN and determines whether the received AIN matches that of the aircraft (step 724). If the received AIN does not match the AIN of the aircraft, the call is not intended for a passenger on the aircraft; hence, the call distribution device 111 does not respond, but instead, awaits another call signal 31 (step 726). If, however, the received AIN matches the AIN of the aircraft, response signal generator 115 generates A/C response signal 35, which transceiver 109 transmits back to the appropriate transmit/receive unit 32 (step 728), as described above with respect to FIG. 2.

Seat-to-telephone correlation device 113 of call distribution device 111 then reads the seat assignment, the digital information of the received call signal 31 (step 730), identifies which telephone 37 in the aircraft corresponds to that seat assignment (step 732), and notifies switch 114 of the telephone to be called. If the user detector 52 provides a signal to the user detector control 514 indicating that the target passenger is seated (Step 734), a signal is provided to the respective telephone 37 indicative of an incoming call (Step 736). A call connection is established when the passenger picks up the phone (step 738), and the appropriate caller identification will be provided. The telephone connection is established when ground station 30 responds to the A/C response signal 35 by calling the queued call-back number of the caller and the caller answers the return call. If, in step 734, the passenger was indicated to not be seated or present, the communications system stores a caller identification or other message until the passenger is once again seated (Step 740). In one embodiment, the user detector 52 provides a signal indicating user presence when the user is detected. The user detector control waits for this signal (Step 742) and, upon receiving it, the system delivers the call notification as described above. Alternatively, or additionally, in step 740, the communications system provides a return message to the caller indicating that the passenger is not seated and that the caller should attempt his telephone call later.

Figure 4:
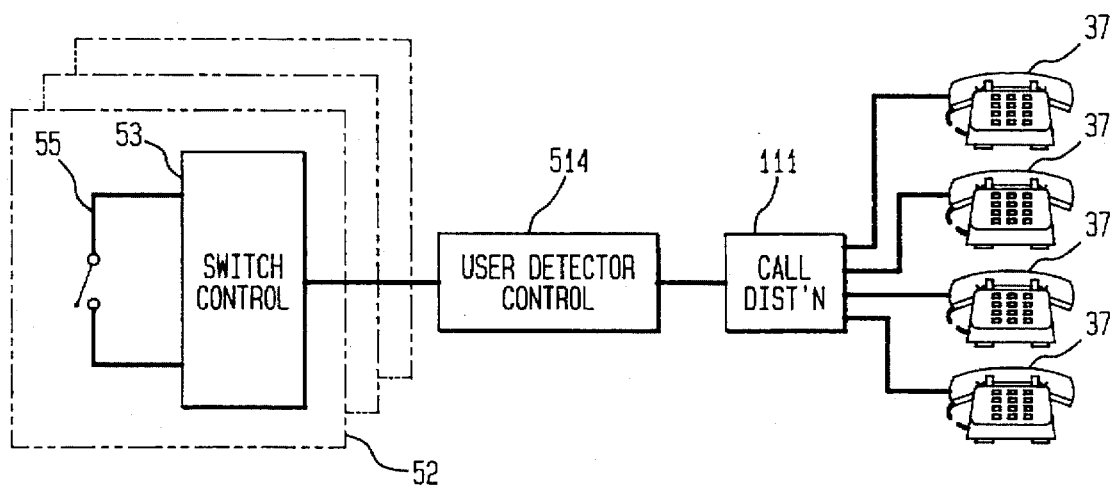
FIG. 4 is a block diagram of a user detection system according to the present invention.

FIG. 4—User Detection System

Turning now to FIG. 4, a more detailed block diagram of a user detection system is shown. The user detection system of FIG. 4 includes one or more user detectors 52 coupled to a user detector control 514. User detector control 514 in turn is coupled to a call distribution device 111, which is used to distribute incoming calls to a plurality of telephones 37. User detector control 514 is used to interface signals received from user detector 52 to call distribution device 111, such that call distribution device 111 is notified of when a passenger is seated in a seat that is correlated with the appropriate telephone 37. Each user detector 52 preferably comprises a switch 55 coupled to a switch control 53. When switch 55 is closed, thereby indicating the presence of a user, switch control 53 provides a signal to user detector control 514 so that call distribution device 111 can be notified of the presence of the user. User detector 52 is positioned within a seatbelt of passenger seat 501 (not shown). For example, with reference to FIG. 1A, when insertable end 526 is inserted into receptacle end 524 of the seatbelt, switch 55 is closed, which allows switch control 53 to send a signal to user detector control 514 indicating the presence of the passenger.

Alternatively, as discussed above, user detector 52 may be positioned within passenger seat 501 itself. For example, user detector 52 is positioned within the seat portion of user seat 501 or within the seat back of seat 501. When the user is seated in seat 501, switch 55 is closed, thereby permitting switch control 53 to transmit a signal to user detector control 514 that the user is seated. Switch 55 comprises, for example, any of a variety of switches, including button type switches or various plane type or area switches, or switches responsive to activation from sources other than pressure, such as temperature.

Figure 5:
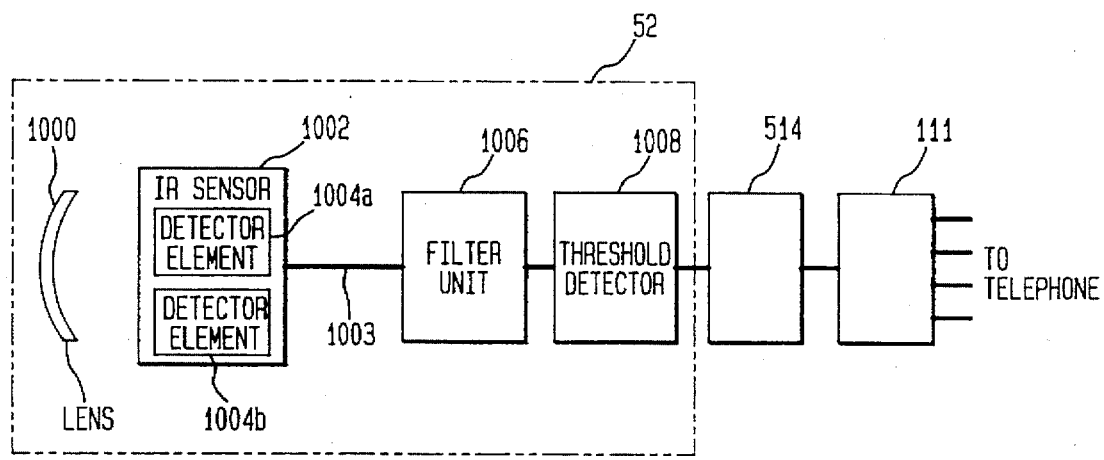
FIG. 5 is a block diagram of another user detection system according to the present invention.

FIG. 5—Infrared User Detector

FIG. 5 illustrates an exemplary user detector 52c employing a passive infrared (PIR) sensor to detect the presence of a passenger. User detector 52c is positioned within the arm 503c of passenger seat 501c. Alternatively, infrared user detector 52c may be positioned within the seatback of passenger seat 502 facing the target passenger seated in passenger seat 501.

User detector 52c comprises a lens 1000 configured to direct incident infrared radiation or heat from the region being monitored onto an infrared sensor 1002. Lens 1000 comprises any of a variety of optical or non-optical lenses. For example, lens 1000 may comprise a clear planar piece of plastic having no optical properties. Alternatively, lens 1000 may comprise a lens having optical properties and configured to direct incident infrared radiation on a focal point or points as desired. Lens 1000 may still further comprise a Fresnel lens or a segmented Fresnel lens array defining a plurality of individual Fresnel lenslets to direct the incident radiation as desired. Infrared (IR) sensor 1002 receives infrared radiation from the region being monitored via the lens 1000 and produces an output voltage on the line 1003 representative of the incident IR radiation.

IR sensor 1002 may comprise a dual element integrated circuit detector chip which provides two separate detector elements 1004a and 1004b on one chip with a single output line 1003 for the two detectors. Radiation striking each element generates a representative signal. The detector elements and chip circuitry are configured such that if IR radiation strikes the two detectors simultaneously, the signals from the two detectors cancel, and in an ideal system, no signal appears at output line 1003. This permits the detectors to discriminate against overall background changes in temperature. Thus, a temperature change over the area covered by both detectors produces opposite signals in the opposing detector elements, thereby canceling one another and preventing the device from transmitting a signal on line 1003. However, if radiation strikes detector element 1004a and detector 1004b sequentially, then no cancellation occurs and two sequential signals are produced at the output line 1003. Thus, the detector elements 1004a and 1004b are able to detect when a target object moves across user detector 52c's field of view.

The detector output signal on line 1003 is provided to a signal processing and filter unit 1006 which provides various signal processing functions including amplification and filtering to remove spurious signal components that likely come from sources unrelated to a person or similar warm target entering the detector's field of view. The signal processing and filter unit 1006 comprises, for example, a high pass filter, which filters out lower frequency components of the signal typically caused by variable enviromental conditions, such as local temperature variations or spurious signals caused by air movement from individual air ducts. In addition, a low pass filter is provided to eliminate unwanted higher frequency components from spurious infrared radiation impinging on a detector or from induced electrical interference.

The output of signal processing and filter unit 1006 is provided to a threshold detector or comparator 1008. The threshold detector 1008 receives the output signal and determines whether it is of sufficient magnitude to warrant triggering the alarm. The threshold detector 1008 thus serves as another method of avoiding false alarms. A desired target, such as a passenger, within the range of the motion detector will emit, at a minimum, a comparatively large quantity of infrared radiation and, consequently, undesired signals may be discriminated against on the basis of magnitude. A filtered signal greater than a threshold magnitude is assumed to be generated by a desired target in the range of the device and in response a signal is provided to user detector control 514. Electrical signals less than the threshold value are assumed to be generated by something other than a seated passenger and no signal is provided. Thus, user detector 52c is able to detect when a passenger moves into and out of seat 501c.

Figure 6:
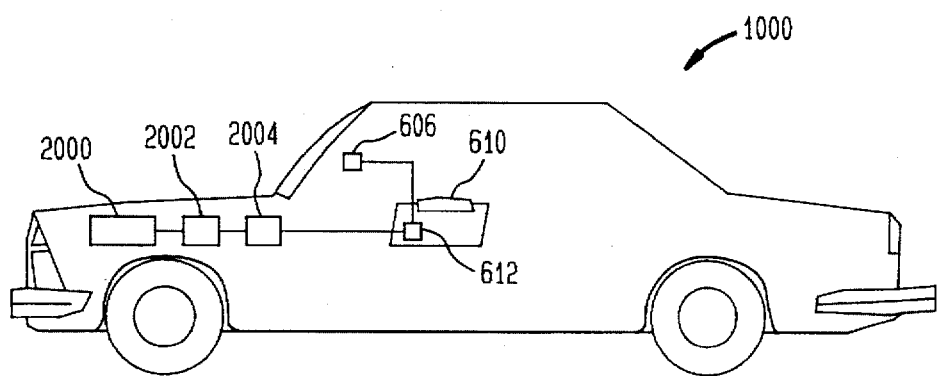
FIG. 6 is a block diagram of vehicular telecommunications system having user detection for use in a motor vehicle.

FIG. 6 Automotive Communication System Having User Detection

Turning now to FIG. 6, a block diagram of a communication system having a user detection mechanism for use in an automotive environment is illustrated. A motor vehicle 1000 is illustrated, having an engine 2000 coupled to a generator 2002, which in turn is coupled to a battery 2004. Engine 2000 comprises an internal combustion engine, for example. Generator 2002 charges battery 2004 while engine 2000 is running.

Also included in motor vehicle 1000 is a telephone 610, typically a cellular, PCS, digital wireless, or other wireless telephone. Telephone 610 includes a power controller 612 which is coupled to control and distribute power from battery 2004 to telephone 610. Power controller 610 is further coupled to a user detector 606. As will be discussed in greater detail below, in one embodiment, user detector 606 activates upon the user fastening his or her seat belt. In an alternative embodiment, user detector 606 comprises an infrared detector. The user detector 606 transmits a signal to the power controller 612, which causes power to be supplied from the battery 2004.

Figure 7A:
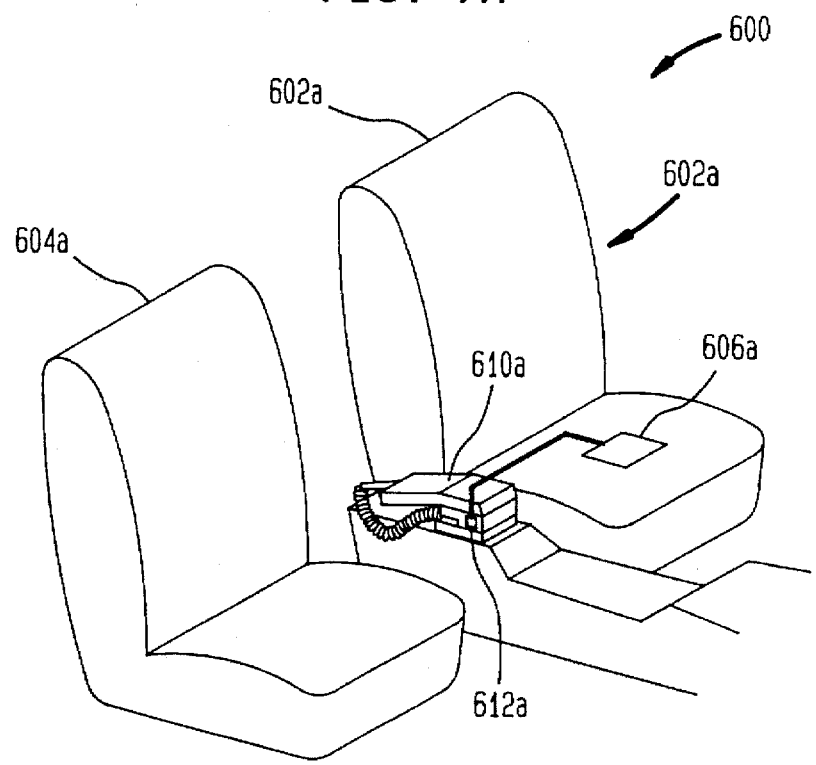
FIG. 7A, 7B, 7C and 7D are diagrams of embodiments of a passenger interface and user detection system according to the vehicular telecommunications system of FIG. 6.

FIG. 7A, 7B, 7C and 7D—User Detectors for Use with Automotive Communications System FIG. 7A illustrates a portion of a passenger compartment 600 of a motor vehicle, including a driver seat 602a, and a passenger seat 604a. A telephone 610a such as a cellular telephone is also provided within reach of a driver seated within seat 602a or passenger seated in seat 604a. Driver's seat 602a includes a user detector 606a coupled to telephone 610a via a power control unit 612a. User detector 606a comprises, for example, a switch configured to be activated when the driver is seated in seat 602a. It is to be noted that user detector 606a may further be comprised within the back portion of seat 602a. In addition, a user detector (not shown) may be positioned within passenger seat 604a. Thus, FIG. 7A is exemplary only.

Figure 7B:
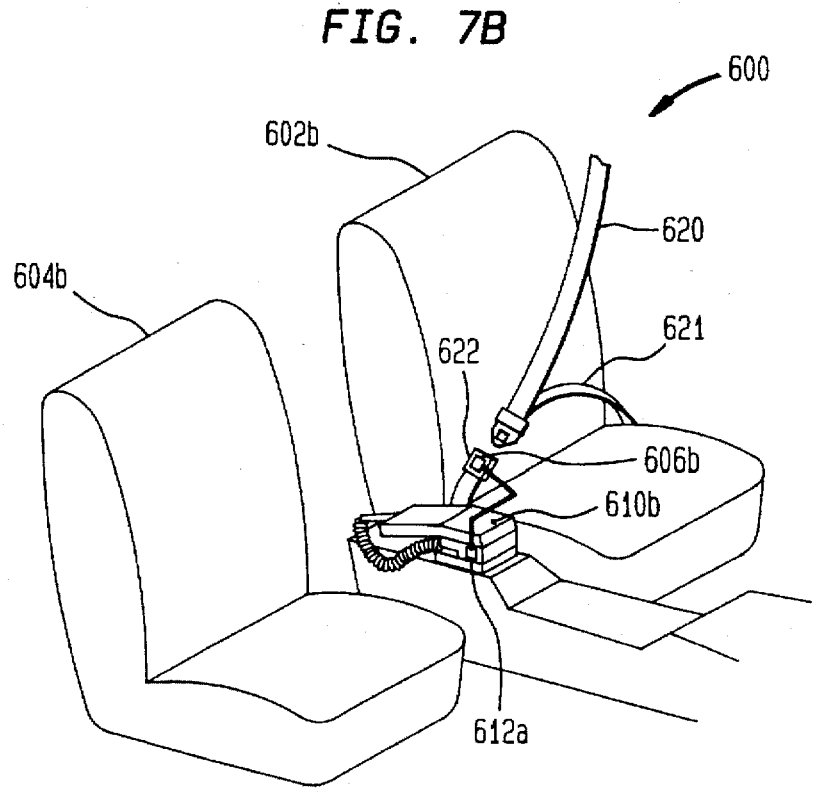

Turning now to FIG. 7B a seatbelt user detection mechanism for use with an automotive communications device is illustrated. Driver seat 602b is illustrated with a seatbelt 621 comprising an insertable portion 620 and receptacle portion 622. Receptacle portion 622 includes a user detector 606b, typically a switch and associated circuitry, which provides a signal to power control unit 612b of telephone 610b. When the seatbelt 621 is buckled (i.e., when insertable end 620 is inserted within or coupled to receptacle end 622), a signal is provided to power control unit 612b of telephone 610b indicating that the driver or other user is present. It is noted that a similar seatbelt detection mechanism may be provided for a user in passenger seat 604b as well as any rear seats. Thus, FIG. 7B is exemplary only.

Figure 7C:
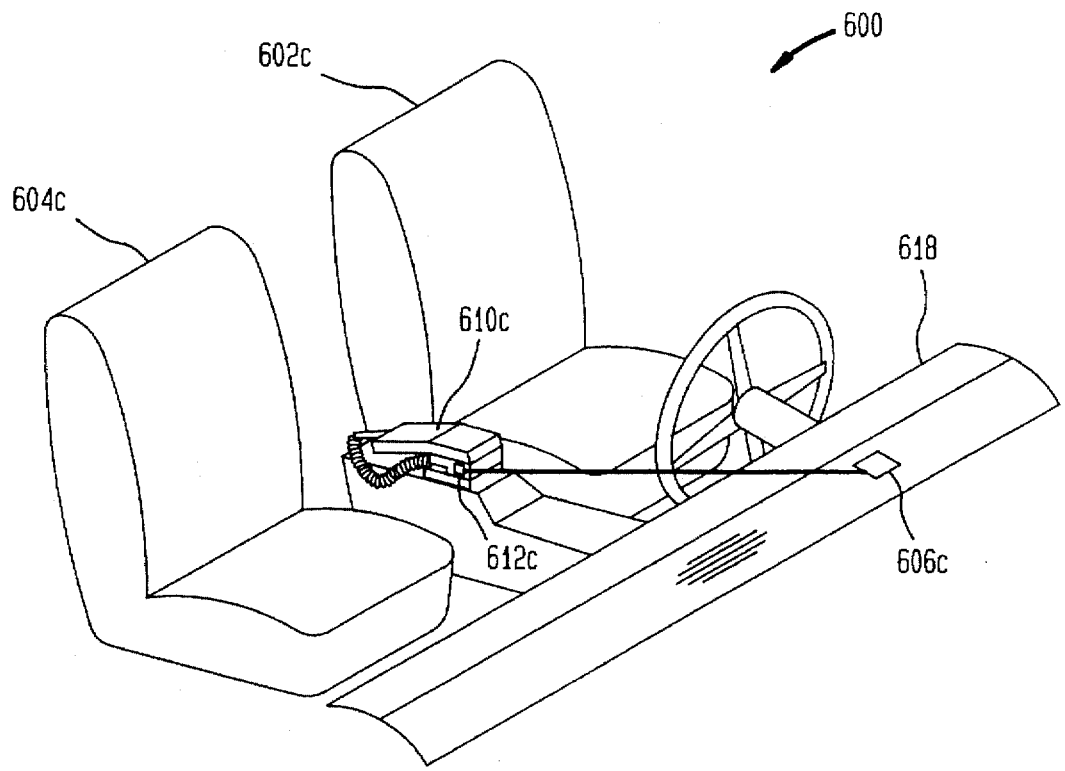

Turning now to FIG. 7C, an infrared user detection mechanism for use with a automotive communications system is illustrated. A passenger or user detector 606c is positioned, for example, within the dashboard 618 of the motor vehicle. User detector 606c is positioned such that when a driver enters or exits the motor vehicle, user detector 606c transmits a signal to power control unit 612c of telephone 610c to indicate the presence or absence of the driver and to thereby cause power to be provided to telephone 610c. Again, user detector 606c may be provided to detect a user in seat 604c or any rear seats. Thus, FIG. 7C is exemplary only.

Figure 7D:
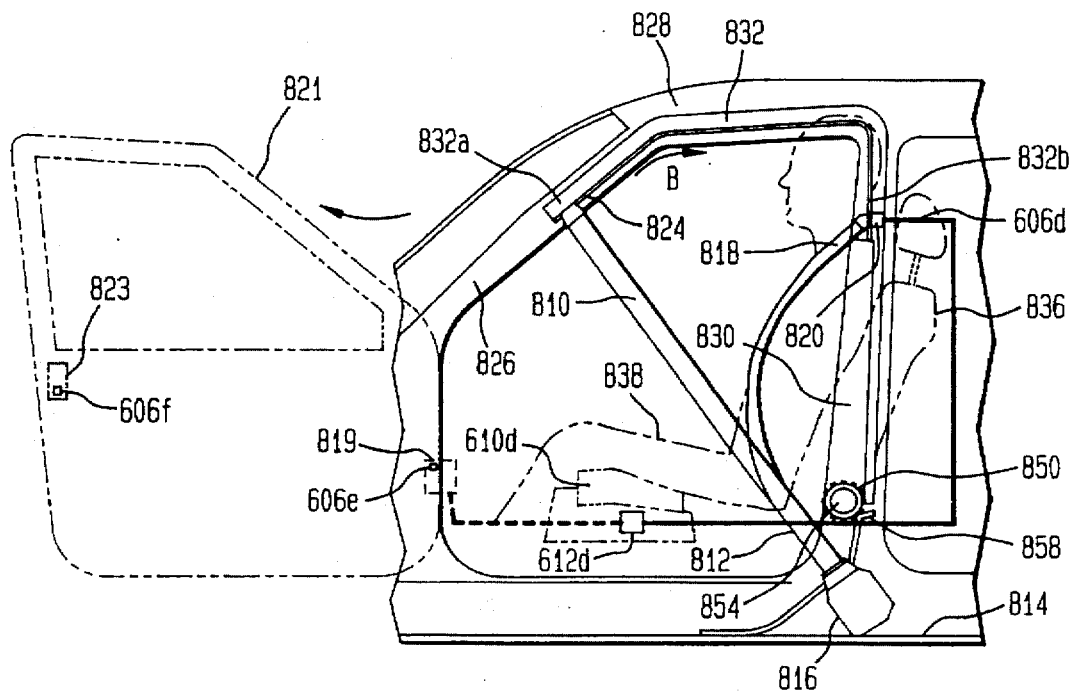

Turning now to FIG. 7D, a user detection mechanism for use with a automatic or partially automatic seatbelt system is illustrated. As illustrated in FIG. 7D, the inner end 812 of a passenger restraining belt 810 is wound up by a retractor 816, which is fastened to the floor 814 of the motor vehicle. The retractor 816 is mourned along the center of the vehicle and winds up the passenger restraining belt 810 by its own force. The retractor 816 is further fitted with an inertial locking mechanism which can stop the extension of the belt 810 during a vehicular emergency. The outer end 818 of the belt 810 is fastened to an anchor plate 820 and the anchor plate 820 is fastened to a slider 824 by a fastening bolt. The slider 824 slides along a guide rail 832, which is fastened along the from pillar 826, roof side 828 and center pillar 830 of the automobile. The slider 824 moves along a groove guide 834 in the longitudinal direction of the guide rail 832.

As shown by the double dot interrupted lines in FIG. 7D, when the passenger enters or exits the vehicle, slider 824 moves toward the front end 832a of guide rail 832 and thereby moves belt 810 toward to the front of the passenger 838 seated in the seat 836. In this way, a space for entering or exiting for the passenger 838 is formed. When the passenger 838 has seated himself, slider 824 moves to the lower end of the vertical part of 832b along center pillar 830. As is shown by the double dot lines in FIG. 7D, belt 810 is caused to approach and securely fasten passenger 838. More particularly, when slider 824 is within the vertical part 832b of guide rail of 832, along the pillar 830, forward or backward motion of the anchor plate 820 together with slider 824 is prevented. Since the anchor plate 820 holds the outer end 818 of the belt 810, the passenger is protected.

In addition, second and third guide rails 848 and 854 are provided to guide a guide tape (not shown) which attaches to slider 824. The guide tape engages with a sprocket wheel 850 which is rotatable by a motor 858. The motor 858 is configured to operate after sensing the entering or exiting of a passenger. When a passenger 838 closes the door after seating himself, sprocket wheel 850 is rotated to move the slider 824 and anchor plate 820 to the rear of guide rail 832 (in the direction of B). At this point, the slider 824 and anchor plate 820 activate a user detector 606d which is coupled to provide a signal to power control unit 612d of telephone 610d. When the passenger 838 opens the door, in order to exit, the sprocket wheel 850 is rotated in the reverse direction to move the slider 824 and the anchor plate 820 towards the front of the guide rail 830. The movement of the anchor plate and the slider causes the user detector 606d to signal that the user is no longer present.

It is noted that while user detector 606d is illustrated as being activatable by slider 824, in other embodiments, a user detector 606e may be provided which is activatable by a mechanism associated with a hinge 819 of the vehicle's door 821 (illustrated in phantom) which detects the passenger opening and/or closing the door 821. It is further noted that a user detection mechanism 606f may also be associated with the door latching mechanism 823.

Further details concerning the operation of the seatbelt system may be obtained from Tanaka et al., U.S. Pat. No. 4,223,915, which is hereby incorporated herein by reference as if set forth in its entirety.

Figure 8:
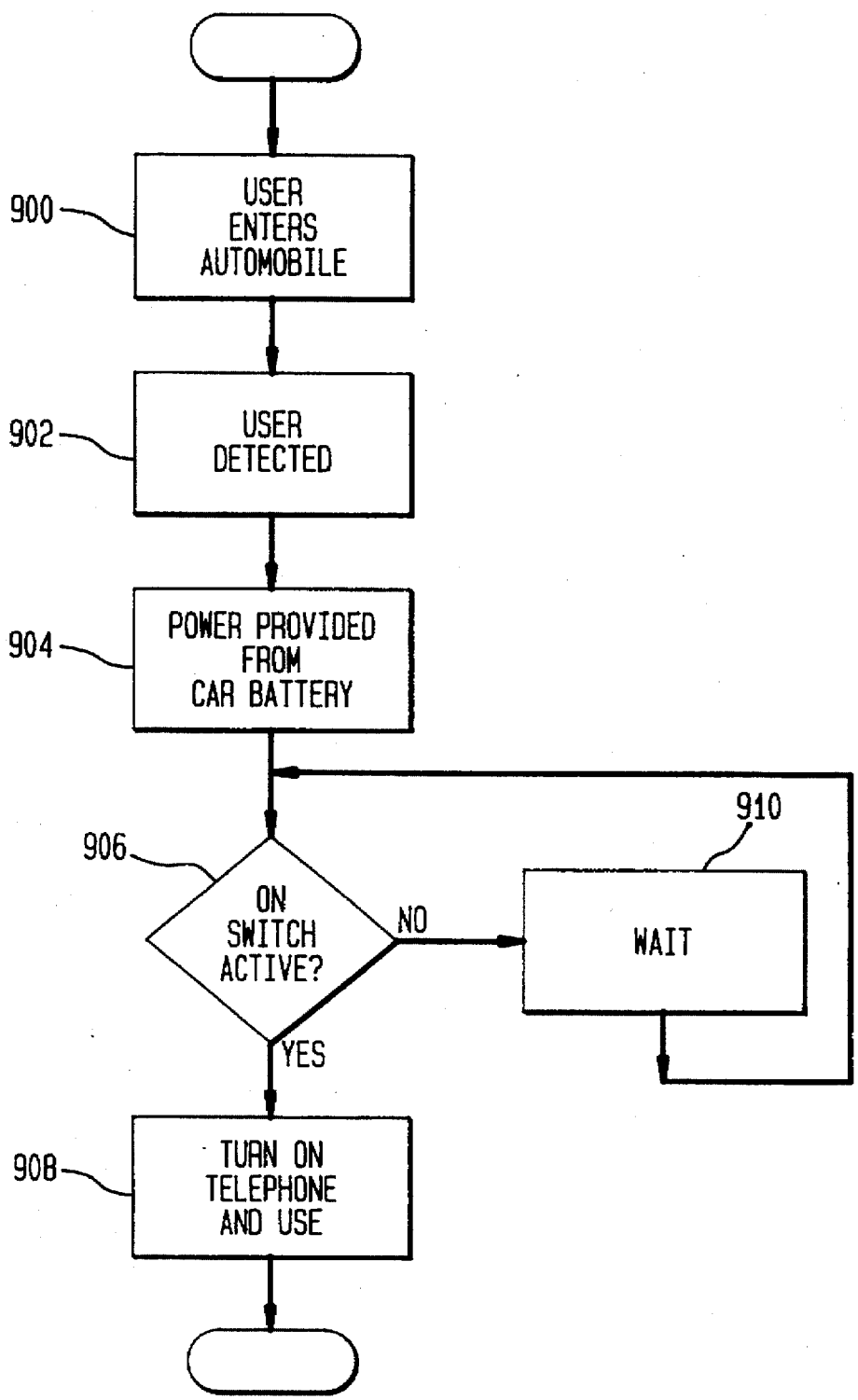
FIG. 8 is a flowchart of the operation of the vehicular telecommunications system with user detection of FIG. 6.

FIG. 8—Flowchart of User Detection for Automotive Communications System

FIG. 8 illustrates the operation of the user detection mechanisms as shown in FIG. 7A, B, 7C and 7D. Upon the user's entry into the automobile (step 900), the user sits in the appropriate seat. If the user detection mechanism is located within the user's seat, the user detection mechanism will provide a signal to the power control unit 612 of the telephone 610 (step 902). Alternatively, if the user detection mechanism is an infrared (IR) detector 606c, the signal will be provided to the power control unit 612 as soon as the user enters the automobile. On the other hand, if the detector is positioned within or associated with the seatbelt, either in a passive (automatic), semi-passive (semi-automatic) or active belt system, the signal will be provided and the user will be detected when the seatbelt is fastened or activated. Similarly, the signal may be provided when the door is opened. Upon detection of the user in step 902, the power control unit 612 activates a relay which couples power from the battery to the telephone (step 904). If the telephone's on-switch is active (step 906), the telephone will be ready for use (step 908). If in step 906 the telephone's on-switch was not activated, then a wait state (step 910) is entered, wherein the telephone will not be activated for use until the on switch is activated. It is noted that in alternate embodiments, the on-switch may be configured such that the telephone is activated when the handset is lifted from its housing.

Figure 9:
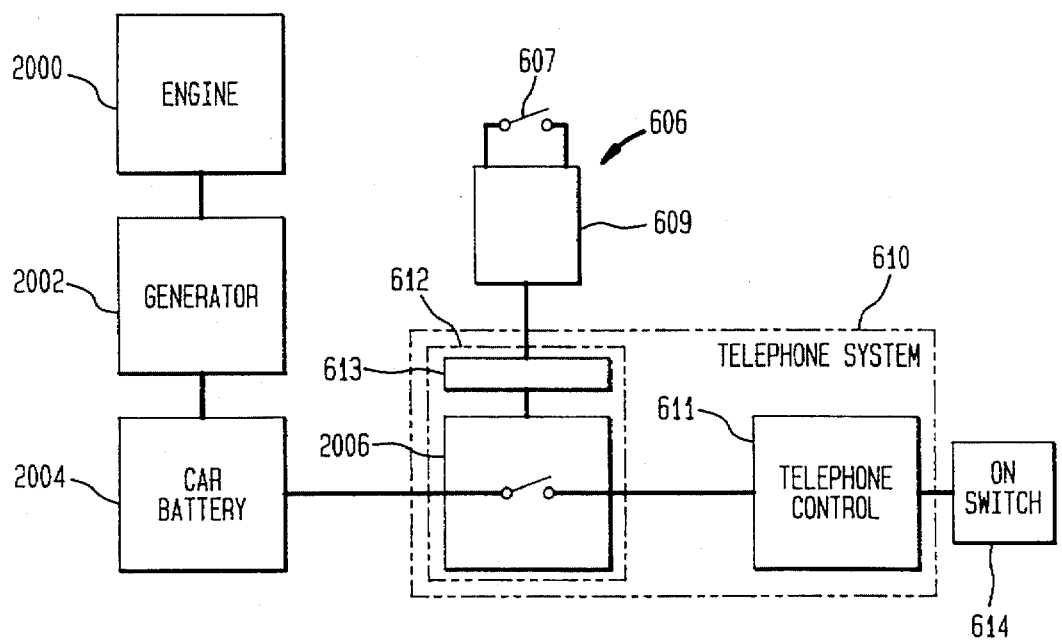
FIG. 9 is a block diagram of a user detection system according to the present invention.

FIG. 9—User Detection System

Turning now to FIG. 9, a user detection system employing a switching mechanism for use in an automotive communications system is shown. The system includes an engine 2000 coupled to a generator 2002, which in turn is coupled to a battery 2004. The output of battery 2000 is provided to a relay 2006 within power control unit 612. The relay 2006 is further coupled to a user detection mechanism 606 and a power management unit 613. As discussed above, switch-based user detection mechanism 606 may be positioned in a variety of locations within the vehicle including within the seatbelt or within the seat or seatback portion of a user's seat. The reference numeral 606 is used for simplicity.

User detection mechanism 606 further includes a switch control 609 and a switch 607. When the user activates the switch, either by sitting in the seat (not shown) or through activating the seatbelt (not shown), a signal is provided from switch control unit 609 to power management unit 613. Power management unit 613 responds to the signal from switch control 609 by activating relay 2006, which then couples the battery 2004 to the telephone's control unit 611. When the switch 614 is activated (either by pressing a dedicated button or by lifting a handset from a housing), telephone control unit 611 will turn on the telephone 610.

Figure 10:
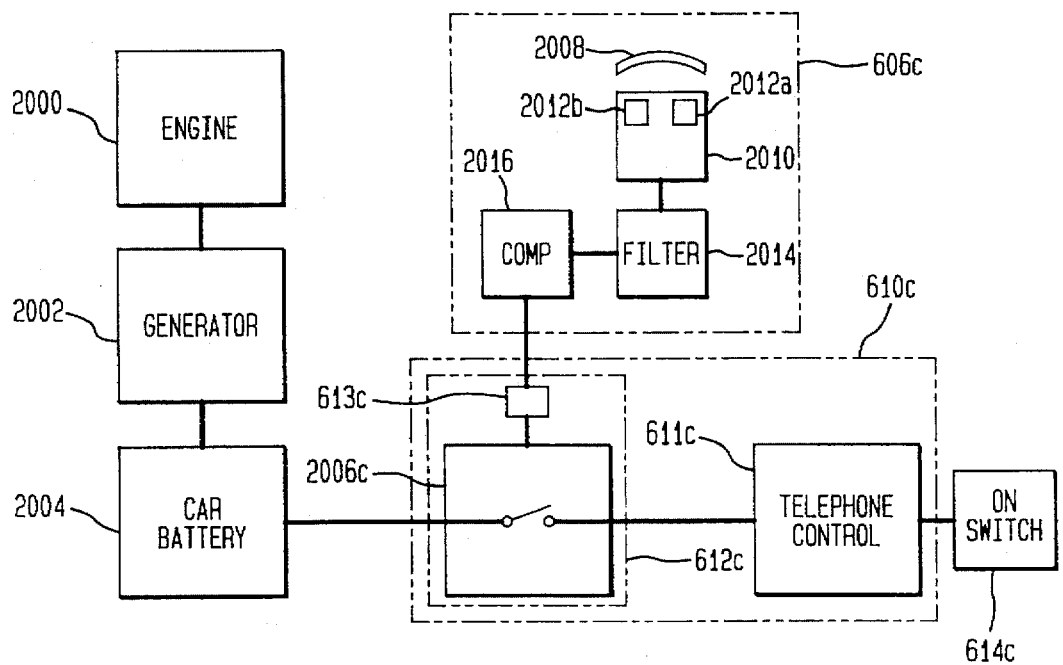
FIG. 10 is a block diagram of another user detection system according to the present invention.

FIG. 10—User Detection Mechanism Employing Passive Infrared Detector

Turning now to FIG. 10, the user detection mechanism for an automotive communications system employing a passive infrared detector is illustrated. More particularly, an engine 2000 is coupled to an electrical generator 2002 which in turn is coupled to car or motor vehicle battery 2004. Battery 2004 and user detector 606c are both coupled to telephone system 610c. Telephone system 610c includes a power control unit 612c including a power management unit 613c and a relay 2006c. Relay 2006c is coupled to provide power from battery 2004 to telephone control 611c. If a user is detected, user detector 606c provides a signal to power control unit 612c, which activates relay 2006c. If on switch 614c is depressed or otherwise activated, power is delivered to telephone control unit 611c.

User detector 606c comprises a lens 2008 which, as noted above with respect to the aircraft communications system's user detector, may comprise either optical or non-optical material sufficient to direct infrared radiation to IR sensor 2010. IR sensor 2010 includes a pair of detector elements 2012a and 2012b. As noted above, the detector elements serve to distinguish between changes in ambient temperature and the movement of a user into the appropriate seat. IR sensor 2010 provides a signal to filter and signal processing block 2014. As discussed above, filter and signal processing block 2014 includes high pass filters and low pass filters to remove various spurious signal elements. Filter and signal processing block 2014 provides a signal in turn to comparator unit 2016. Comparator unit 2016 includes a threshold detector to reject signals that are below a predetermined threshold. When a person moves into the seat within the field of view a lens 2008, a signal is provided to the power control 612 of the telephone system 610.

The invention described in the above detailed description is not intended to be limited to the specific form set forth herein, but on the contrary, it is intended to cover such alternatives, modifications, and equivalents as can reasonably be included within the spirit and scope of the invention as defined by the appended claims. Such alternatives may, for example, include the case in which one telephone is provided for several users. Other embodiments include the case in which the user detection system is comprised in an office telephone setting, rather than a vehicular one.

We claim:

1. A vehicular telecommunications system, comprising:
   a telephone controller comprised in a vehicle and adapted to process a plurality of telephone signals;
   a telephone comprised in said vehicle and operably coupled to said telephone controller, wherein said telephone is adapted for use by a user in said vehicle, wherein said telephone is adapted to receive telephone calls for said user associated with said telephone from sources external to the vehicle in which said telephone is installed; and
   a user detector comprised in said vehicle and operably coupled to said telephone controller, wherein said user detector is configured to provide a signal to said telephone controller indicative of whether said user associated with said telephone is present in a predetermined location of said vehicle proximate to said telephone, wherein said telephone controller directs a received telephone call for said user to said telephone responsive to said signal indicating that said user is present in said predetermined location of said vehicle proximate to said telephone.

2. The vehicular telecommunications system of claim 1, wherein said telephone controller is configured to store information regarding said received telephone call for a predetermined period if said user detector indicates that said user associated with said telephone is absent from said predetermined location of said vehicle.

3. The vehicular telecommunications system of claim 1, wherein said telephone controller is configured to provide a message to a caller placing said received telephone call if said user associated with said telephone is absent from said predetermined location of said vehicle.

4. The vehicular telecommunications system of claim 1, wherein said user detector comprises a switch located in a seatbelt of a passenger seat associated with said user and said telephone.

5. The vehicular telecommunications system of claim 4, wherein said seatbelt comprises a receptacle portion and an insertable portion adapted to couple to one another in a secured fashion.

6. The vehicular telecommunications system of claim 5, wherein said switch is configured to be activated when said receptacle portion and said insertable portion are coupled to one another in said secured fashion.

7. The vehicular telecommunications system of claim 6, wherein said user detector is configured to provide said signal to said telephone controller when said switch is activated.

8. The vehicular telecommunications system of claim 1, wherein said user detector comprises a switch located in a passenger seat associated with said user and said telephone.

9. The vehicular telecommunications system of claim 8, wherein said switch is located within a seat portion of said seat and is configured to be activated when said user is positioned within said seat.

10. The vehicular telecommunications system of claim 8, wherein said switch is located within a back portion of said seat and is configured to be activated when said user is positioned within said seat.

11. The vehicular telecommunications system of claim 9, wherein said user detector is configured to provide said signal to said telephone controller when said switch is activated.

12. The vehicular telecommunications system of claim 10, wherein said user detector is configured to provide said signal to said telephone controller when said switch is activated.

13. The vehicular telecommunications system of claim 1, wherein said user detector comprises a passive infrared detector.

14. The vehicular telecommunications system of claim 13, wherein said passive infrared detector is configured to detect whether said user is located within a predetermined proximity to a passenger seat associated with said telephone and to provide said signal if said user is within said predetermined proximity.

15. The vehicular telecommunications system of claim 14, wherein said passive infrared detector is positioned within an armrest of said passenger seat.

16. A vehicular telecommunications system, comprising:
   a battery comprised in a vehicle;
   a telephone comprised in said vehicle and operably coupled to said battery and adapted for use by a user, wherein said telephone is adapted to receive telephone calls from sources external to the vehicle in which said telephone is installed, said telephone comprising a power control unit; and
   a seatbelt comprised in said vehicle and positioned proximate to said telephone, wherein said seatbelt is configured to be engaged in a secured fashion around said user, said seatbelt comprising a user detector operably coupled to said power control unit, said user detector coupled to provide a signal to said power control unit indicative of whether said user has engaged said seatbelt such that power is supplied from said battery to said telephone responsive to said signal indicating that said seatbelt has been engaged.

17. The vehicular telecommunications system of claim 16, wherein said seatbelt comprises a receptacle portion and an insertable portion.

18. The vehicular telecommunications system of claim 17, wherein said user detector comprises a switch in said receptacle portion such that said switch is activated when said insertable portion is engaged in said receptacle portion.

19. The vehicular telecommunications system of claim 16, wherein said seatbelt is automatically engaged when user is seated in said vehicle.

20. The vehicular telecommunications system of claim 19, wherein said seatbelt comprises:
   a slider to which one end of said seatbelt is attached;
   a guide rail for guiding said slider; and
   a drive system for driving said slider along said guide rail.

21. A vehicular telecommunications system, comprising:
   a battery comprised in a vehicle;
   a telephone comprised in said vehicle and operably coupled to said battery, wherein said telephone is adapted for use by a user and is adapted to receive telephone calls from sources external to the vehicle in which said telephone is installed, said telephone comprising a power control unit; and a seat comprised in said vehicle and positioned proximate to the telephone and adapted to receive said user, wherein the seat comprises a user detector operably coupled to said power control unit, said user detector coupled to provide a signal to said power control unit indicative of whether said user is seated in said seat such that power is supplied from said battery to said telephone responsive to said signal.

22. The vehicular telecommunications system of claim 21, wherein said user detector comprises a switch activatable when said user is seated in said seat.

23. A vehicular telecommunications system, comprising:
a battery comprised in a vehicle;
a telephone comprised in said vehicle and operably coupled to said battery, said telephone being adapted for use by a user and adapted to receive telephone calls from sources external to the vehicle in which said telephone is installed, said telephone comprising a power control unit;
a seat comprised in said vehicle, said seat being positioned proximate to said telephone and adapted to receive said user; and
a passive infrared detector operably coupled to provide a signal to said power control unit indicative of whether said user is seated in said seat such that power is supplied from said battery to said telephone responsive to said signal.

24. A telecommunications system, comprising:
a telephone controller adapted to process a plurality of telephone signals;
a telephone operably coupled to said telephone controller, and adapted for use by a user, wherein said telephone is adapted to receive telephone calls for said user associated with said telephone;
a seat operably coupled to said telephone and said telephone controller and adapted to receive said user; and
a user detector operably coupled to said telephone controller and configured to provide a signal to said telephone controller indicative of whether said user associated with said telephone is determined to be present in a predetermined proximity to said seat, such that said telephone controller directs a received telephone call for said user to said telephone responsive to said signal.

25. The telecommunications system of claim 24, wherein said telephone controller is configured to store information regarding said received telephone call for a predetermined period if said user detector indicates that said user associated with said telephone is absent from said predetermined proximity to said seat.

26. The telecommunications system of claim 24, wherein said telephone controller is configured to provide a message to a caller of said received telephone call if said user associated with said telephone is absent from said predetermined proximity to said seat.

27. The telecommunications system of claim 24, wherein said user detector comprises a switch located in said seat and said switch is activated to provide said signal when said user is seated in said seat.

28. The telecommunications system of claim 24, wherein said user detector comprises a passive infrared detector.

29. A method of operating a vehicular telecommunications system, comprising:
a telephone controller operably coupled to a telephone receiving a telephone call from a source external to a vehicle in which said telephone is installed;
a user detector operably coupled to said telephone controller determining whether a user associated with said telephone is located within a predetermined proximity to said telephone;
said user detector providing a signal to said telephone controller indicative of whether said user is located within said predetermined proximity to said telephone; and
said telephone controller directing said telephone call to said telephone responsive to said signal.

30. The method of claim 29, wherein said determining comprises activating a switch responsive to said user being located within said predetermined proximity to said telephone.

31. The method of claim 30, wherein said activating a switch comprises activating a switch located in a seat configured to receive said user.

32. The method of claim 31, wherein said activating comprises activating a switch located within a seatbelt configured to secure said user within said seat.

33. The method of claim 29, wherein said determining comprises receiving an infrared signal responsive to said user being located within said predetermined proximity to said telephone.

34. A vehicular telecommunications system, comprising:
a battery comprised in a vehicle;
a telephone comprised in said vehicle and operably coupled to said battery and adapted for use by a user, wherein said telephone is adapted to receive telephone calls from sources external to the vehicle in which said telephone is installed, said telephone comprising a power control unit; and
a door comprised in said vehicle and positioned proximate to said telephone, wherein said door comprises a user detector operably coupled to said power control unit, said user detector coupled to provide a signal to said power control unit indicative of whether said user has engaged said door such that power is supplied from said battery to said telephone responsive to said signal indicating that said user has engaged said door.

35. The vehicular telecommunications system of claim 34, wherein said user detector is comprised in a door latch associated with said door.

36. The vehicular telecommunications system of claim 34, wherein said user detector is comprised in a door hinge associated with said door.

* * * * *